UNITED STATES PATENT OFFICE.

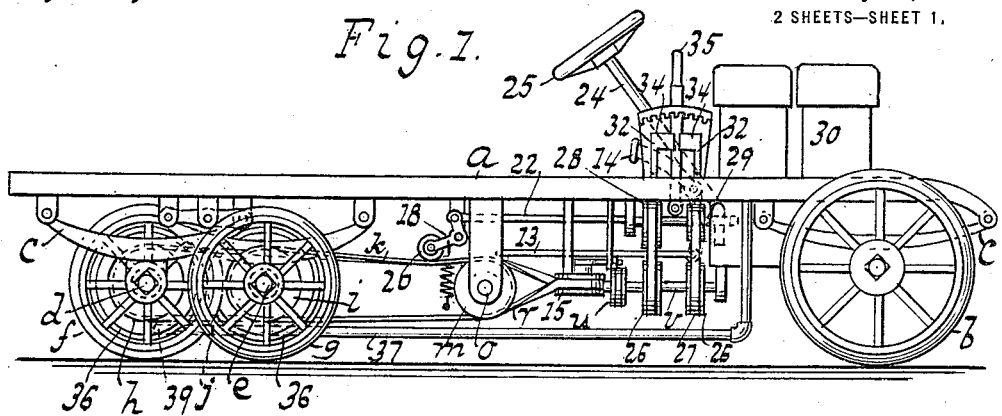

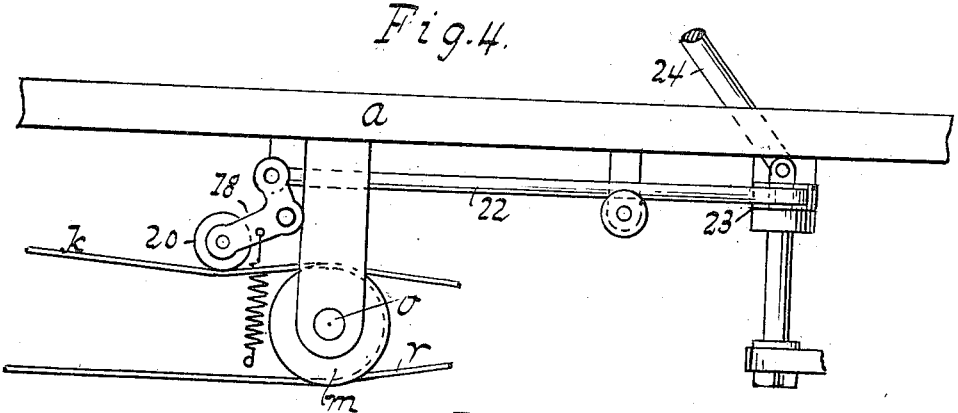
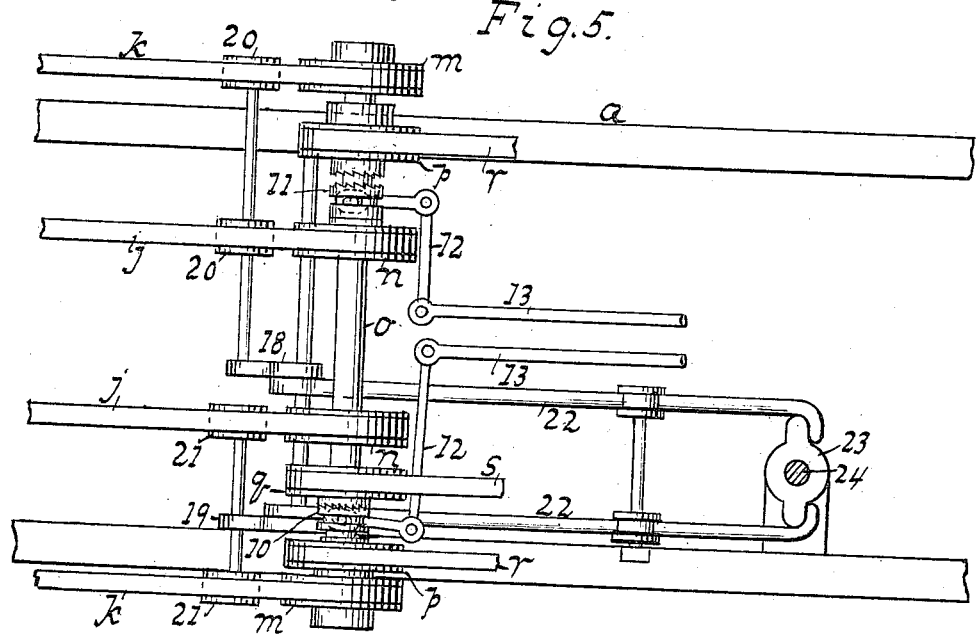
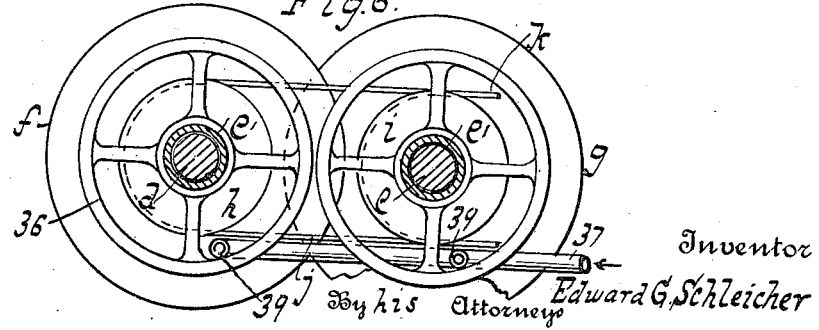

EDWARD G. SCHLEICHER, OF STAMFORD, CONNECTICUT.

MOTOR-VEHICLE.

1,266,999.	Specification of Letters Patent.	Patented May 21, 1918.

Application filed January 3, 1917. Serial No. 140,352.

*To all whom it may concern:*

Be it known that I, EDWARD G. SCHLEICHER, a citizen of the United States, residing at Stamford, in the county of Fairfield, State of Connecticut, have invented new and useful Improvements in Motor-Vehicles, of which the following is a specification.

This invention relates to a motor vehicle in which the rear wheels are connected to a motor by a belt drive, the object of the invention being to provide tensioning devices coacting with the belts and automatically operated simultaneously with the horizontal oscillation of the forward wheels.

The invention is designed to provide simple and efficient means operated by the rotation of the steering stem for moving a number of the tension devices out of action, to permit variable or differential rotation of the rear driving wheels when turning corners or steering the vehicle from a straight path.

The invention also includes two pairs of rear driving wheels, one pair being in advance and out of alinement with the other pair, to give increased traction and at the same time eliminate skidding of the drive wheels.

Another object of the invention is to provide the driving shaft with a plurality of pulleys of different diameters connected by belts with a counter shaft, and a rock lever coacting with the belts for varying the speed of the counter shaft which is connected by belt devices with the rear wheels. The invention also provides a transmission shaft having a number of belt connections with the counter shaft and sliding clutch members mounted on the shaft for engagement with one or the other of the pulleys to reverse the rotation of the rear driving wheels, without reversing the counter shaft.

Another object of the invention is, to provide the rear axles with drums of smaller diameter than the wheels, so that when the vehicle is traveling on soft muddy ground or snow, the drums which are driven at the same speed as the driving wheels will engage the ground to give increased traction. Tubular connections between the exhaust of the motor and the drums are adapted to heat the drums to melt the snow in contact with the drums.

The novel combinations of the invention are more fully described in the following specification and claims and illustrated in the accompanying drawings in which:

Figure 1 represents a side elevation of a motor car embodying this invention.

Fig. 2 is an inverted plan view of the same.

Fig. 3 is a detailed view of the variable speed belt tensioning devices.

Fig. 4 is a detailed side elevation of the driving belt tensioning devices.

Fig. 5 is an inverted plan view of the same.

Fig. 6 is a sectional side elevation of the drums.

In these drawings the letter $a$ designates the frame or chassis of a car and $b$ are the forward wheels. Springs $c$ are connected at the forward and rear portions of the chassis in the usual way. The rear portion of the vehicle is provided with a pair of axles $d$ and $e$ each having mounted thereon a plurality of sleeves $e'$ carrying the wheels $f$ and $g$, one being secured at each end of the respective sleeves. The wheels $f$ are slightly in the rear and inside or out of line with the other pair to constitute an auxiliary drive for the vehicle. Pulleys $h$ and $i$ are fixed to the said sleeves and connected by means of belts $j$ and $k$ to pulleys $m$ and $n$ secured to a transverse transmission shaft $o$. As shown there is a belt connection for each wheel so that when the invention is used in combination with a heavy motor truck, it will give a powerful drive to the rear wheels.

The transmission shaft has loosely mounted thereon a number of pulleys $p$ and $q$ having belt connections $r$ and $s$ with pulleys $t$ and $u$ respectively secured to a counter shaft $v$. A pair of clutches 10 and 11 are slidingly mounted on the transmission shaft. These clutches are connected by bell crank levers 12, and rod 13 to a pair of foot levers 14 for operating the clutches. When the clutch 11 is in engagement with the pulley $p$ as indicated in Fig. 2, it reverses the rotation of the transmission shaft and the rear wheels to move the motor truck backward. Consequently, when it is desired to have the vehicle travel forward, the clutch 11 is moved out of engagement as indicated in Fig. 5, and the clutch 10 slid into engagement with the pulley $q$ thus transmitting the motion of the counter shaft to the belt $s$ and thereby reversing the transmission shaft and the vehicle will travel ahead. The belts $s$ and $r$ pass around idler pulleys 15 swingingly mounted on levers 16 each coacting with adjusting devices 17 for alining an idler pulley against its belt.

The tensioning devices for the driving belts include, bell crank levers 18 and 19 each carrying at one end a pair of idler rollers 20 and 21 for normally engaging the belts, to hold them taut. A rod 22 is connected to each of the bell crank levers and the forward portion of each rod is hook shaped to coöperate with a cam 23 carried on the lower end of a stem 24 provided with steering wheel 25 within reach of the chauffeur to operate the stem. The steering stem is also connected to the forward wheels in the usual manner. When the steering wheel is rotated in one direction it oscillates the cam to move one or the other of the rods 22, to swing a pair of the rollers 20 or 21 out of action. This slackens the pair of belts on one side and the driving wheels $h$ and $g$ on that particular side can rotate faster or slower than the wheels on the other side to allow the vehicle to travel in a curved or angular path. The steering mechanism connected to the forward wheels as indicated in Fig. 2 will actuate the steering wheels simultaneously with the movement of either rod 22 for throwing a pair of the driving belts out of action.

The means for varying the speed of the rear driving wheels consists of a pair of pulleys 26 secured to the counter shaft. These pulleys are connected by belts 27 to pulleys 28 of different diameters fixed to a driving shaft 29 operated by a motor 30. Mounted on a frame at 31, are a pair of rock levers 32 each provided with an idler roller 33 and a wedge shaped cam 34 to coact at times with a lever 35 controlled by the chauffeur. When the lever is in its neutral position as shown in Fig. 1, both of the rock levers will be out of engagement with the belts 27 and the vehicle will stop. When it is desired to go ahead the lever 35 is swung back or forward so that one of the rock levers will be actuated to tension the belt. Either one of the rock levers can swing into action to vary the speed of the vehicle.

At the rear portion of the vehicle between the frames are arranged a number of drums 36 preferably one for each wheel. These drums are mounted on the sleeves that carry the pulleys $i$ and $h$ and, therefore, rotate when the pulleys are driven. The drums can rotate at differential speeds to correspond with the rotation of the driving wheels. A pipe 37 is connected to the exhaust 38 of the motor. This pipe leads the hot gases from the exhaust, by means of branch pipes or nozzles 39 into the ends of the drums, so that the heat radiated by the drums will dry any moisture on the ground in contact with the drums and pack any dry snow to give better traction to the vehicle on slippery ground. It will be seen that when the invention is employed with a vehicle having a gear transmission drive the belts $k$ could be omitted and the auxiliary drive used in connection with the transmission.

I claim:

1. In a motor vehicle the combination with a pair of rear axles, of a pair of wheels mounted on each of the axles one pair being in advance and out of alinement with the other pair; belts connected to each of the axles for actuating the wheels, a pair of front wheels, means for steering the latter wheels, and tensioning devices including levers each having a number of idler rollers each pair of which is independently operated by the steering means for engagement with the belts.

2. In a motor vehicle the combination with a pair of rear axles, of a pair of wheels mounted on each of the axles one pair being in advance and out of alinement with the other pair; a pair of belts connected to each of the axles for actuating the wheels, a pair of front wheels, means for steering the latter wheels, tensioning devices including levers each having a number of idler rollers each pair of which is independently connected to the steering means for engagement with the belts, and means operated by the steering means for moving one or the other of the tensioning devices out of action.

3. In a motor vehicle the combination with a pair of rear axles, of a pair of wheels mounted on each of the axles one pair being in advance and out of alinement with the other pair; a pair of belts connected to each of the axles one being opposite the other for actuating the wheels, a pair of front wheels, means for steering the latter wheels, tensioning devices including a pair of levers each carrying a pair of idler rollers connected to the steering means for engagement with the belts, and means operated by the steering means for moving one or the other of the tensioning devices out of action to slacken the belts on one side of the vehicle.

4. In a motor vehicle the combination with a pair of rear axles, of a pair of wheels mounted on each of the axles one pair being in advance and out of alinement with the other pair; a pair of belts connected to each of the axles one being opposite the other for actuating the wheels, a pair of front wheels, means for steering the latter wheels, tensioning devices including a roller coacting with each belt, and a rod operated by the steering means for moving a pair of the rollers out of action to slacken the belts on one side of the vehicle.

5. In a motor vehicle the combination with a pair of rear axles, of a pair of wheels mounted on each of the axles one pair being in advance and out of alinement with the other pair; a pair of belts connected to each of the axles one being opposite the other for actuating the wheels, a pair of front wheels, means for steering the latter wheels, tensioning devices including a roller coacting with each belt, and a pair of rods operated by the steering means for moving either pair of the rollers out of action to slacken the belts on one side of the vehicle.

In testimony whereof I have hereunto set my hand in the presence of two subscribing witnesses.

EDWARD G. SCHLEICHER.

Witnesses:
JOHN A. BERGSTROM,
GRACE DE VOE.